United States Patent
Lu et al.

(10) Patent No.: US 10,435,556 B2
(45) Date of Patent: Oct. 8, 2019

(54) BIODEGRADABLE POLYESTER COMPOSITION

(71) Applicants: KINGFA SCI. & TECH. CO., LTD., Guangdong (CN); ZHUHAI WANGO CHEMICAL CO., LTD., Guangdong (CN); TIANJIN KINGFA NEW MATERIAL CO., LTD., Tianjin (CN)

(72) Inventors: Changli Lu, Guangdong (CN); Zhimin Yuan, Guangdong (CN); Tongmin Cai, Guangdong (CN); Xianbo Huang, Guangdong (CN); Xiangbin Zeng, Guangdong (CN); Jian Jiao, Guangdong (CN); Renxu Yuan, Guangdong (CN); Yuke Zhong, Guangdong (CN); Kai Xiong, Guangdong (CN); Hui Yang, Guangdong (CN); Kaijin Mai, Guangdong (CN); Xueteng Dong, Guangdong (CN)

(73) Assignees: KINGFA SCI. & TECH. CO., LTD., Guangdong (CN); ZHUHAI WANGO CHEMICAL CO., LTD., Guangdong (CN); TIANJIN KINGFA NEW MATERIAL CO., LTD., Tianjin (CN)

( * ) Notice: Subject to any disclaimer, the term of this patent is extended or adjusted under 35 U.S.C. 154(b) by 50 days.

(21) Appl. No.: 15/578,689

(22) PCT Filed: Feb. 24, 2017

(86) PCT No.: PCT/CN2017/074673
§ 371 (c)(1),
(2) Date: Nov. 30, 2017

(87) PCT Pub. No.: WO2017/152772
PCT Pub. Date: Sep. 14, 2017

(65) Prior Publication Data
US 2018/0171136 A1 Jun. 21, 2018

(30) Foreign Application Priority Data
Mar. 7, 2016 (CN) .......................... 2016 1 0126862

(51) Int. Cl.
*C08L 67/02* (2006.01)
*C08K 5/1535* (2006.01)
*C08K 5/156* (2006.01)
*C08L 25/14* (2006.01)
*C08L 67/04* (2006.01)

(52) U.S. Cl.
CPC ............. *C08L 67/02* (2013.01); *C08K 5/156* (2013.01); *C08K 5/1535* (2013.01); *C08L 25/14* (2013.01); *C08L 67/04* (2013.01); *C08L 2201/06* (2013.01); *C08L 2201/08* (2013.01); *C08L 2205/02* (2013.01); *C08L 2205/03* (2013.01)

(58) Field of Classification Search
None
See application file for complete search history.

(56) References Cited

U.S. PATENT DOCUMENTS

2004/0019178 A1* 1/2004 Gross ..................... C08G 63/78
528/274
2012/0288650 A1* 11/2012 Freese ..................... C08K 3/26
428/35.5

FOREIGN PATENT DOCUMENTS

| CN | 102639594 | 8/2012 |
| CN | 103687902 | 3/2014 |
| CN | 104479304 | 4/2015 |
| CN | 104744898 | 7/2015 |
| CN | 105585824 | 5/2016 |
| JP | S6067550 | 4/1985 |
| WO | 2009071475 | 6/2009 |

OTHER PUBLICATIONS

Canellas et al. (Anal Bioanal Chem (2015) 407:6781-6790, UPLC-ESI-Q-TOF-MSE and GC-MS identification and quantification of non-intentionally added substances coming from biodegradable food packaging).*
"International Search Report (Form PCT/ISA/210)", dated Jun. 1, 2017, with English translation thereof, pp. 1-4.

* cited by examiner

*Primary Examiner* — Robert T Butcher
(74) *Attorney, Agent, or Firm* — JCIPRNET

(57) ABSTRACT

A biodegradable polyester composition based on a total weight of the biodegradable polyester composition, including a weight content of a cyclic ester compound having a structure shown as formula (I) which is 100 ppm-950 ppm; and based on the total weight of the biodegradable polyester composition, a weight content of tetrahydrofuran is 3 ppm-200 ppm is provided. The cyclic ester compound and tetrahydrofuran is added into the composition and controlling the content of the cyclic ester compound and the content of tetrahydrofuran in a certain range in the composition to realize an anti-thermal oxidative aging property of the biodegradable polyester composition. In addition, a film is prepared by blow molding or a part is prepared by injection molding after being digested with 95% ethanol at 40° C. for 240 hours.

(I)

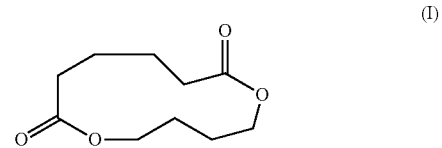

21 Claims, No Drawings

BIODEGRADABLE POLYESTER COMPOSITION

CROSS-REFERENCE TO RELATED APPLICATION

This application is a 371 of international application of PCT application Ser. No. PCT/CN2017/074673, filed on Feb. 24, 2017, which claims the priority benefit of China application no. 201610126862.8, filed on Mar. 7, 2016. The entirety of each of the above-mentioned patent applications is hereby incorporated by reference herein and made a part of this specification.

TECHNICAL FIELD

The present invention belongs to a field of modification of macromolecule materials, and specifically relates to a biodegradable polyester composition with excellent anti-thermal oxidative aging property, surface appearance property and printing performance.

BACKGROUND

Biodegradable polyester is a kind of macromolecule material using biological resources as raw materials. With respect to a petroleum-based polymer using petrochemical resources as raw materials, the biodegradable polyester can be degraded during a process of biological or biochemical effect or in a biological environment, being a very active degradable material in the present biodegradable plastic research and one of the best degradable materials in market application.

At present, biodegradable polyester film takes one of the most important application fields of biodegradable polyester, mainly including grocery bag, garbage bag, shopping bag, mulching film and the like. During blow molding process of the biodegradable polyester in preparing films, ink supply is required and thereby desired labels and logos are printed on the film. However, during the printing process of biodegradable polyester film, the printing is frequently unreliable (i.e. ink does not fully adhere to the film or an adhesion strength is not enough) or the printing is excessive (i.e. too much ink adheres to the film resulting unclear logos), which indicates poor printing performance of the film.

In addition, owing to effects of microorganism, illumination, radiation, atmosphere and contacted physical environment, a molding product prepared with the biodegradable polyester is relatively easy to age and degrade during storage and use, which hugely influences service performance of the product. A conventional method that solves the aging and the degradation of macromolecule material includes adding an antioxidant, a UV absorbent, a HALS stabilizer and the like into the material. For example, patent WO 2009/071475 discloses a mulching film of polyethylene which contains hydroxyphenyltriazines as the stabilizer. CN 103687902 introduces the UV absorbent and the HALS stabilizer, or a light stabilizer combining both, for providing the mulching film with UV stability. Although the above stabilizers can provide certain stabilization, they are definitely not satisfactory for a transparent mulching film, especially for that with a relatively thin wall thickness.

Besides, under a condition that the molding product prepared with the biodegradable polyester composition is digested with 95% ethanol, there will be a precipitate separating out of a surface of a film or a part, which thus influences a surface appearance property of the film or the part.

The present invention surprisingly finds by research that by adding a trace amount of a cyclic ester compound and tetrahydrofuran into the biodegradable polyester composition, an anti-oxidative property of the biodegradable polyester composition can be greatly enhanced, and meanwhile it guarantees the biodegradable polyester composition with excellent surface appearance property. Moreover, it prevents the ink from stripping off the film material during the printing process and prevents excessive ink from adhering to the film material, so that the film shows excellent printing performance.

SUMMARY OF THE INVENTION

An object of the present invention is to provide a biodegradable polyester composition. By adding a trace amount of a cyclic ester compound and tetrahydrofuran into the composition, the prepared biodegradable polyester composition may have excellent anti-thermal oxidative aging property, surface appearance property and printing performance.

The present invention is realized by following technical solution:

a biodegradable polyester composition includes following components in parts by weight:

i) 60 to 100 parts of biodegradable aliphatic-aromatic polyester;
ii) 0 to 40 parts of polylactic acid;
iii) 0 to 35 parts of an organic filler and/or an inorganic filler;
iv) 0 to 1 part of a copolymer which contains epoxy group and is based on styrene, acrylate and/or methacrylate.

In particular, based on a total weight of the biodegradable polyester composition, a weight content of a cyclic ester compound having a structure shown as formula (I) is 100 ppm-950 ppm;

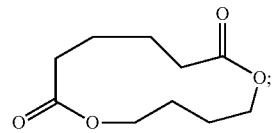

and based on the total weight of the biodegradable polyester composition, a weight content of tetrahydrofuran is 3 ppm-200 ppm.

Preferably, based on the total weight of the biodegradable polyester composition, the weight content of the cyclic ester compound is 160 ppm-750 ppm, preferably 210 ppm-540 ppm, and the weight content of tetrahydrofuran is 8 ppm-100 ppm, preferably 15 ppm-75 ppm.

Preferably, the biodegradable polyester composition includes the following components in parts by weight:

i) 65 to 95 parts of the biodegradable aliphatic-aromatic polyester;
ii) 5 to 35 parts of the polylactic acid;
iii) 5 to 25 parts of the organic filler and/or the inorganic filler;
iv) 0.02 to 0.5 part of the copolymer which contains epoxy group and is based on styrene, acrylate and/or methacrylate.

The biodegradable aliphatic-aromatic polyester is one or more of poly(butyleneadipate-co-terephthalate) (PBAT), poly(butylenesuccinate-co-terephthalate) (PBST) and poly(butylenesebacate-co-terephthalate) (PBSeT).

Addition of the cyclic ester compound helps to extend a service life of the biodegradable polyester composition. Tetrahydrofuran added into the biodegradable polyester plays a lubricant-like part. In research, the present invention found that controlling the content of the cyclic ester compound as 100 ppm-950 ppm and the content of tetrahydrofuran as 3 ppm-200 ppm in the biodegradable polyester composition, may not only guarantee the biodegradable polyester composition having good anti-thermal oxidative aging property, but also guarantee the prepared film or the prepared part having excellent surface appearance property. Besides, a coefficient of kinetic friction for the film material may be within a reasonable range, which prevents the ink from stripping off the film material during the printing process (i.e. unreliable printing) and prevents excessive ink from adhering to the film material, so that the film shows excellent printing performance.

However, if the content of the cyclic ester compound in the biodegradable polyester composition is too high, the cyclic ester compound will separate out of a surface of a film or a part under a condition of being digested with 95% ethanol, which influences the surface appearance property of the film or the part. If the content of tetrahydrofuran in the biodegradable polyester composition is too high, the coefficient of kinetic friction for the film is extremely small, resulting in that the printing can't be realized. If the content of tetrahydrofuran is too low, the coefficient of kinetic friction is too large, resulting in that excessive ink adheres to the film during the printing process. Therefore, based on the total weight of the biodegradable polyester composition, the weight content of the cyclic ester compound is preferably 160 ppm-750 ppm, more preferably 210 ppm-540 ppm; and the weight content of tetrahydrofuran is preferably 8 ppm-100 ppm, more preferably 15 ppm-75 ppm.

The organic filler is selected from a group consisting of natural starch, plasticized starch, modified starch, natural fiber and wood flour, or a mixture thereof. The inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

A route of acquiring the cyclic ester compound and tetrahydrofuran in the present invention may be by means of adding the cyclic ester compound and tetrahydrofuran directly during blending, extruding and processing the biodegradable polyester composition.

According to different needs of use, the biodegradable polyester composition according to the present invention may be further added with 0 to 4 parts of at least one of following substances: plasticizer, release agent, surfactant, wax, antistatic agent, pigment, UV absorbent, UV stabilizer and other plastic additives.

The plasticizer is one of or a mixture of two or more of citric esters, glycerol, epoxidized soybean oil and the like.

The release agent is one of or a mixture of two or more of silicone oil, paraffin, white mineral oil and Vaseline.

The surfactant is one of or a mixture of two or more of polysorbate, palmitate and laurate.

The wax is one of or a mixture of two or more of erucamide, stearamide, behenamide, beeswax and beeswax ester.

The antistatic agent is a permanent antistatic agent, specifically listed as one of or a mixture of two or more of PELESTAT-230, PELESTAT-6500 and SUNNICO ASA-2500.

The pigment is one of or a mixture of two or more of carbon black, black masterbatch, titanium dioxide, zinc sulfide, phthalocyanine blue and fluorescent orange.

The UV adsorbent is one or more of UV-944, UV-234, UV-531 and UV-326.

The UV stabilizer is one or more of UV-123, UV-3896 and UV-328.

The other plastic additives may be nucleating agent, antifogging agent and the like.

The biodegradable polyester composition according to the present invention may be used for preparing shopping bag, compost bag, mulching film, protective cover film, silo film, film strip, fabric, non-fabric, textile, fishing net, bearing bag, garbage bag and the like.

Compared to the prior art, the present invention has following beneficial effects:

In the present invention, by adding the cyclic ester compound and tetrahydrofuran into the composition and controlling the content of the cyclic ester compound in a range of 100 ppm-950 ppm and the content of tetrahydrofuran in a range of 3 ppm-200 ppm in the composition, not only the anti-thermal oxidative aging property of the biodegradable polyester composition may be greatly improved, at the same time when the film prepared by blow molding or the part prepared by injection molding has little precipitate separating out of the surface and has excellent surface appearance property after being digested with 95% ethanol at 40° C. for 240 hours. Moreover, poor printing of the biodegradable polyester composition during the printing process may be hugely improved, neither the ink stripping off the film material, nor excessive ink adhering to the film material, so that the film shows excellent printing performance.

DETAILED DESCRIPTION OF THE PREFERRED EMBODIMENT

The present invention will be further described below by way of specific implementations, and the following embodiments are preferred implementations of the present invention, but the implementations of the present invention are not limited by the following embodiments.

In the embodiments of the present invention, PBAT is chosen as a component i); ADR4370 is chosen as a component iv); starch is chosen as an organic filler; talcum powder and calcium carbonate are chosen as inorganic filler; citric esters is chosen as a plasticizer; palmitate is chosen as a surfactant; and stearamide is chosen as a wax. The above-mentioned promoters, PBAT, ADR4370, PLA, cyclic ester compound and tetrahydrofuran are commercially available.

Embodiments 1-16 and Comparative Embodiments 1-2:

According to formulae shown in Table 1, PBAT, PLA, ADR4370, organic fillers, inorganic fillers, promoters such as plasticizer, surfactant, wax and the like, a cyclic ester compound and tetrahydrofuran were mixed evenly and put into a single screw extruder. After being extruded at 140° C.–240° C. and prilled, the compositions were obtained. Data of performance tests is shown in Table 1.

Performance evaluation method:

(1) Evaluation method for an anti-thermal oxidative aging property of a biodegradable polyester composition:

the biodegradable polyester composition was sealed in a non-vacuum aluminum foil bag. The aluminum foil bag was put in an air dry oven at 70° C. to perform a thermal oxidative aging test. Samples were taken every 3 days for testing a melting index (190° C./2.16 kg, according to ISO 1133). When the melting index of the sample was beyond a normal melting index range of the biodegradable polyester composition, it indicated that an obvious thermal oxidative aging degradation had occurred in the biodegradable polyester composition. A test time that the obvious thermal oxidative aging degradation occurred in the biodegradable polyester composition was recorded. The shorter the test time was, the poorer the anti-thermal oxidative aging property of the biodegradable polyester composition was indicated.

(2) Evaluation method for a surface appearance property of a molding product:

A 2 mm palette was injection molded and put into a solution of 95% ethanol at 40° C. for being digested for 240 hours, followed by being placed in a standard laboratory with an atmosphere temperature of (23±2) ° C. and a relative humidity of 45%-55%. After the palette was adjusted for 48 hours, ΔL, a variation of L-value of the palette before treated and after treated, was measured via a colorimeter. The greater the ΔL was, the more the precipitate separated out of the surface and the poorer the surface appearance property was.

(3) Evaluation method for printing performance of the biodegradable polyester composition:

Biodegradable polyester compositions with different printing effects were taken. Based on clarity of a printed label and adherence of ink to a surface of a film, different printing effects were ranked according to following method:

level 1: the label is clear and there is no excessive ink adhering to the film;

level 2: the label is clear but there is a little excessive ink adhering to the film;

level 3: the label is basically clear but there is much ink adhering to the film;

level 4: the label is obscure and there is abundant ink adhering to the film;

level 5: the label can't be shown and there is no ink adhering to the film.

(4) Determination method for the cyclic ester compound: 1.2000 g of the biodegradable polyester composition was weighed accurately, added into a 25 ml volumetric flask, and dissolved by adding chloroform. After the biodegradable polyester composition was dissolved completely, it was diluted to 25 ml. A peak area of the cyclic ester compound in the prepared solution was measured by a GC-MS test. The content of the cyclic ester compound in the biodegradable polyester composition was calculated according to the peak area of the cyclic ester compound in the prepared solution and a standard curve of the cyclic ester compound. The standard curve of the cyclic ester compound was calibrated by a solution of the cyclic ester compound/chloroform.

Models and parameters for GC-MS are as follows:
Agilent Technologies 7693 AutoSampler;
Agilent Technologies 5975C inert MSD with Triple-Axis Detector;
Chromatographic column: J&W 122-5532 UI: 350° C.: 30 m×250 μm×0.25 μm
Sample injection: front SS injection port He (helium)
Sample production: vacuum.

(5) Determination method for tetrahydrofuran:

Drawing of a standard curve of tetrahydrofuran:

Tetrahydrofuran/methanol solutions in concentrations of 0.010 g/L, 0.1 g/L, 1.0 g/L, 5.0 g/L, 10.0 g/L, 20.0 g/L, 50.0 g/L and 100.0 g/L were prepared, respectively. Peak areas of tetrahydrofuran in the tetrahydrofuran/methanol solutions in different concentrations were measured respectively by a static headspace method. The standard curve of tetrahydrofuran was drawn, with the peak area of tetrahydrofuran as an ordinate and the concentration of tetrahydrofuran as an abscissa.

Measurement of a content of tetrahydrofuran in the biodegradable polyester composition:

Approximate 1.2000 g of biodegradable polyester composition was weighed accurately and put into a static headspace test flask; the peak area of tetrahydrofuran in the biodegradable polyester composition was measured by the static headspace method; and the content of tetrahydrofuran in the biodegradable polyester composition was calculated according to the peak area of tetrahydrofuran in the biodegradable polyester composition and the standard curve of tetrahydrofuran. The standard curve was calibrated by the tetrahydrofuran/methanol solution.

Conditions for static headspace test are as follows:
Temperature:
Heater: 105° C.
Quantitative loop: 135° C.
Transmission line: 165° C.
Time:
Balance for sample bottle: 120 minutes
Duration for sample injection: 0.09 minute
GC circulation: 30 minutes.

Instrument models and parameters for static headspace are as follows:
Agilent Technologies 7697 Headspace Sampler;
Agilent Technologies 7890AGC System;
Chromatographic column: J&W 122-7032: 250° C.: 30 m×250 μm×0.25 μm
Sample injection: front SS injection port $N_2$
Sample production: front detector FID.

TABLE 1

Test data of Comparative Embodiments 1-2 and Embodiments 1-16 (parts by weight)

| | Comparative Embodiment 1 | Comparative Embodiment 2 | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|---|
| PBAT | 84.1 | 84.1 | 100 | 84.1 | 84.1 | 84.1 | 84.1 | 84.1 | 67 | 66.5 |
| PLA | 10 | 10 | | 10 | 10 | 10 | 10 | 10 | 15 | 32 |
| starch | | | | | | | | | 17 | |
| talcum powder | 1.6 | 1.6 | | 1.6 | 1.6 | 1.6 | 1.6 | 1.6 | | |
| calcium carbonate | 3.5 | 3.5 | | 3.5 | 3.5 | 3.5 | 3.5 | 3.5 | | |
| ADR4370 | 0.3 | 0.3 | | 0.3 | 0.3 | 0.3 | 0.3 | 0.3 | 0.3 | 0.5 |
| citric esters | | | | | | | | | 0.2 | |
| palmitate | | | | | | | | | | 0.5 |

TABLE 1-continued

Test data of Comparative Embodiments 1-2 and Embodiments 1-16 (parts by weight)

| | Comparative 1 | Comparative 2 | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|---|---|
| stearamide | 0.5 | 0.5 | 0.5 | 0.5 | 0.5 | 0.5 | 0.5 | 0.5 | 0.5 | 0.5 |
| content of the cyclic ester compound (based on the whole composition)/ppm | 54 | 1152 | 100 | 215 | 282 | 316 | 408 | 437 | 495 | 540 |
| content of tetrahydrofuran (based on the whole composition)/ppm | 1 | 227 | 200 | 15 | 19 | 21 | 38 | 44 | 60 | 75 |
| time for thermal oxidative aging/day | 6 | 9 | 12 | 23 | 27 | 28 | 28 | 29 | 29 | 30 |
| ΔL | 0.08 | 1.06 | 0.09 | 0.19 | 0.22 | 0.27 | 0.29 | 0.34 | 0.35 | 0.36 |
| level of printing performance | 4 | 5 | 3 | 1 | 1 | 1 | 1 | 1 | 1 | 1 |

| | Embodiment 9 | Embodiment 10 | Embodiment 11 | Embodiment 12 | Embodiment 13 | Embodiment 14 | Embodiment 15 | Embodiment 16 |
|---|---|---|---|---|---|---|---|---|
| PBAT | 84.1 | 84.1 | 84.1 | 84.1 | 84.1 | 84.1 | 84.1 | 84.1 |
| PLA | 10 | 10 | 10 | 10 | 10 | 10 | 10 | 10 |
| starch | | | | | | | | |
| talcum powder | 1.6 | 1.6 | 1.6 | 1.6 | 1.6 | 1.6 | 1.6 | 1.6 |
| calcium carbonate | 3.5 | 3.5 | 3.5 | 3.5 | 3.5 | 3.5 | 3.5 | 3.5 |
| ADR4370 | 0.3 | 0.3 | 0.3 | 0.3 | 0.3 | 0.3 | 0.3 | 0.3 |
| citric esters palmitate | | | | | | | | |
| stearamide | 0.5 | 0.5 | 0.5 | 0.5 | 0.5 | 0.5 | 0.5 | 0.5 |
| content of the cyclic ester compound (based on the whole composition)/ppm | 160 | 174 | 671 | 750 | 100 | 135 | 839 | 950 |
| content of tetrahydrofuran (based on the whole composition)/ppm | 8 | 12 | 81 | 100 | 3 | 5 | 167 | 200 |
| time for thermal oxidative aging/day | 18 | 20 | 21 | 22 | 13 | 15 | 16 | 16 |
| ΔL | 0.40 | 0.38 | 0.61 | 0.65 | 0.69 | 0.71 | 0.75 | 0.79 |
| level of printing performance | 2 | 2 | 2 | 2 | 3 | 3 | 3 | 3 |

It can be seen from Table 1 that, in the biodegradable polyester composition, when the content of the cyclic ester compound is 100-950 ppm and the content of tetrahydrofuran is 3-200 ppm, the biodegradable polyester composition has better anti-thermal oxidative aging property. Besides, after the biodegradable polyester composition is digested with 95% ethanol at 40° C. for 240 hours, ΔL is less than 0.80 which indicates that the composition has excellent surface appearance property. Also, the level of printing performance can reach above level 3, which indicates that the composition has excellent printing performance. However, in Comparative Embodiment 1, in which the content of the cyclic ester compound is less than 100 ppm and the content of tetrahydrofuran is less than 3 ppm, ΔL of the composition is relatively low, but the time for thermal oxidative aging of the composition is relatively short and the level of printing performance is level 4. In Comparative Embodiment 2, in which the content of the cyclic ester compound is over 950 ppm and the content of tetrahydrofuran is over 200 ppm, ΔL was more than 1.0, and the level of printing performance is level 5. It indicates that there is more precipitate separating out of the surface, and the surface appearance property and the printing performance of the composition are poor.

What is claimed is:

1. A biodegradable polyester composition, comprising following components in parts by weight:
   i) 60 to 100 parts of biodegradable aliphatic-aromatic polyester;
   ii) 0 to 40 parts of polylactic acid;
   iii) 0 to 35 parts of an organic filler and/or an inorganic filler;
   iv) 0 to 1 part of a copolymer which contains epoxy group and is based on styrene, acrylate and/or methacrylate;
   wherein, based on a total weight of the biodegradable polyester composition, a weight content of a cyclic ester compound having a structure shown as formula (I) is 100 ppm-950 ppm;

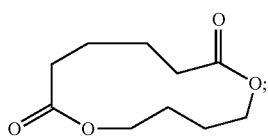

and based on the total weight of the biodegradable polyester composition, a weight content of tetrahydrofuran is 3 ppm-200 ppm.

2. The biodegradable polyester composition according to claim 1, wherein based on the total weight of the biodegradable polyester composition, the weight content of the cyclic ester compound is 160 ppm-750 ppm, and the weight content of tetrahydrofuran is 8 ppm-100 ppm.

3. The biodegradable polyester composition according to claim 1, wherein the following components in parts by weight:
  i) 65 to 95 parts of the biodegradable aliphatic-aromatic polyester;
  ii) 5 to 35 parts of the polylactic acid;
  iii) 5 to 25 parts of the organic filler and/or the inorganic filler;
  iv) 0.02 to 0.5 part of the copolymer which contains epoxy group and is based on styrene, acrylate and/or methacrylate.

4. The biodegradable polyester composition claim 1, wherein the biodegradable aliphatic-aromatic polyester is poly(butyleneadipate-co-terephthalate) (PBAT), poly(butylenesuccinate-co-terephthalate) (PBST), poly(butylenesebacate-co-terephthalate) (PBSeT), or any combinations thereof.

5. The biodegradable polyester composition according to claim 1, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

6. The biodegradable polyester composition according to claim 1, further comprising 0 to 4 parts of plasticizer, release agent, surfactant, wax, antistatic agent, pigment, UV absorbent, UV stabilizer, other plastic additives, or any combinations thereof.

7. The biodegradable polyester composition according to claim 1, wherein a ΔL value of the biodegradable polyester composition is less than 0.80 after being digested with 95% ethanol at 40° C. for 240 hours.

8. The biodegradable polyester composition according to claim 1, wherein a level of printing performance of the biodegradable polyester composition reaches to level 3 or above.

9. The biodegradable polyester composition according to claim 2, wherein the following components in parts by weight:
  i) 65 to 95 parts of the biodegradable aliphatic-aromatic polyester;
  ii) 5 to 35 parts of the polylactic acid;
  iii) 5 to 25 parts of the organic filler and/or the inorganic filler;
  iv) 0.02 to 0.5 part of the copolymer which contains epoxy group and is based on styrene, acrylate and/or methacrylate.

10. The biodegradable polyester composition according to claim 2, wherein the biodegradable aliphatic-aromatic polyester is poly(butyleneadipate-co-terephthalate) (PBAT), poly(butylenesuccinate-co-terephthalate) (PBST), poly(butylenesebacate-co-terephthalate) (PBSeT), or any combinations thereof.

11. The biodegradable polyester composition according to claim 3, wherein the biodegradable aliphatic-aromatic polyester is poly(butyleneadipate-co-terephthalate) (PBAT), poly(butylenesuccinate-co-terephthalate) (PBST), poly(butylenesebacate-co-terephthalate) (PBSeT), or any combinations thereof.

12. The biodegradable polyester composition according to claim 9, wherein the biodegradable aliphatic-aromatic polyester is poly(butyleneadipate-co-terephthalate) (PBAT), poly(butylenesuccinate-co-terephthalate) (PBST), poly(butylenesebacate-co-terephthalate) (PBSeT), or any combinations thereof.

13. The biodegradable polyester composition according to claim 2, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

14. The biodegradable polyester composition according to claim 3, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

15. The biodegradable polyester composition according to claim 9, wherein the organic filler is selected from a group consisting of natural starch, plasticized starch, modified starch, natural fiber and wood flour, or a mixture thereof; and the inorganic filler is selected from a group consisting of talcum powder, montmorillonite, kaolin, chalk, calcium carbonate, graphite, gypsum, conductive carbon black, calcium chloride, ferric oxide, dolomite, silicon dioxide, wollastonite, titanium dioxide, silicate, mica, glass fiber and mineral fiber, or a mixture thereof.

16. The biodegradable polyester composition according to claim 2, further comprising 0 to 4 parts of plasticizer, release agent, surfactant, wax, antistatic agent, pigment, UV absorbent, UV stabilizer, other plastic additives, or any combinations thereof.

17. The biodegradable polyester composition according to claim 3, further comprising 0 to 4 parts of plasticizer, release agent, surfactant, wax, antistatic agent, pigment, UV absorbent, UV stabilizer, other plastic additives, or any combinations thereof.

18. The biodegradable polyester composition according to claim 9, further comprising 0 to 4 parts of plasticizer, release agent, surfactant, wax, antistatic agent, pigment, UV absorbent, UV stabilizer, other plastic additives, or any combinations thereof.

19. The biodegradable polyester composition according to claim 2, wherein a ΔL value of the biodegradable polyester composition is less than 0.80 after being digested with 95% ethanol at 40° C. for 240 hours.

20. The biodegradable polyester composition according to claim 2, wherein a level of printing performance of the biodegradable polyester composition reaches to level 3 or above.

21. The biodegradable polyester composition according to claim 2, wherein based on the total weight of the biodegradable polyester composition, the weight content of the cyclic ester compound is 210-540 ppm, and the weight content of tetrahydrofuran is 15-75 ppm.

* * * * *